No. 620,845. Patented Mar. 7, 1899.
C. HILL.
MECHANICAL MOTOR.
(Application filed Apr. 26, 1898.)
(No Model.) 2 Sheets—Sheet 1.
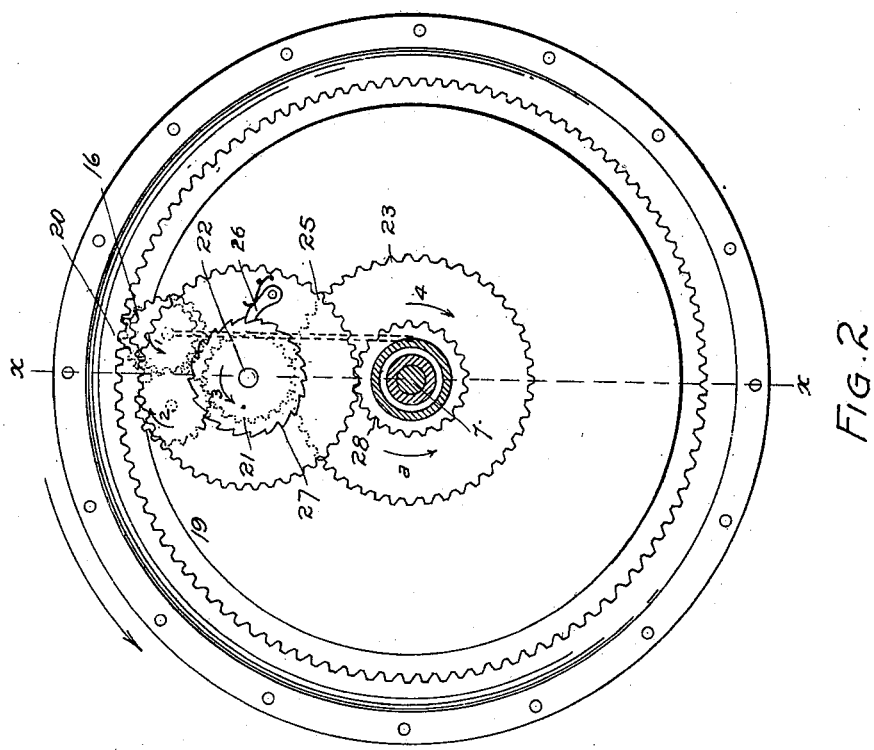
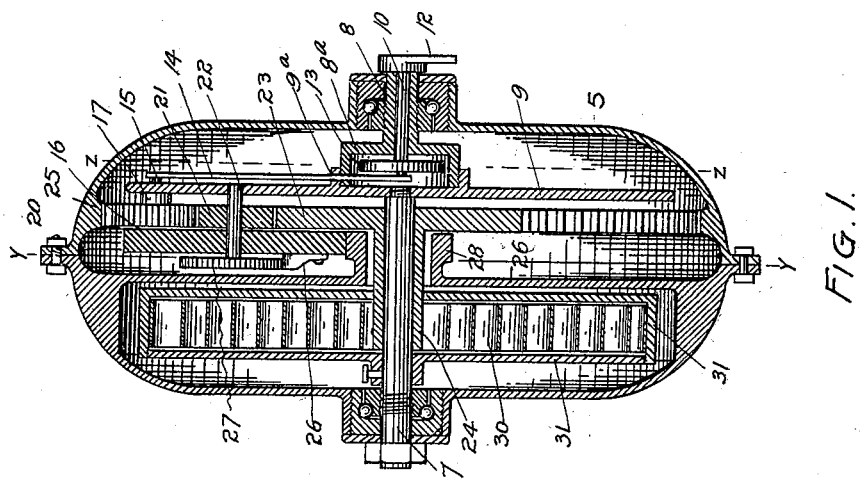
Witnesses
Inventor
Constantine Hill.
By his Attorney No. 620,845. Patented Mar. 7, 1899.
C. HILL.
MECHANICAL MOTOR.
(Application filed Apr. 26, 1898.)
(No Model.) 2 Sheets—Sheet 2.

Witnesses

Inventor
Constantine Hill.
By his Attorney

UNITED STATES PATENT OFFICE.

CONSTANTINE HILL, OF DENVER, COLORADO.

MECHANICAL MOTOR.

SPECIFICATION forming part of Letters Patent No. 620,845, dated March 7, 1899.

Application filed April 26, 1898. Serial No. 678,863. (No model.)

*To all whom it may concern:*

Be it known that I, CONSTANTINE HILL, a citizen of the United States of America, residing at Denver, in the county of Arapahoe and State of Colorado, have invented certain new and useful Improvements in Mechanical Motors; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in motors especially adapted for use in connection with bicycles; but its use is not limited thereto.

The invention consists of the features, arrangements, and combinations hereinafter described and claimed, all of which will be fully understood by reference to the accompanying drawings, in which is illustrated an embodiment thereof.

Figure 4:
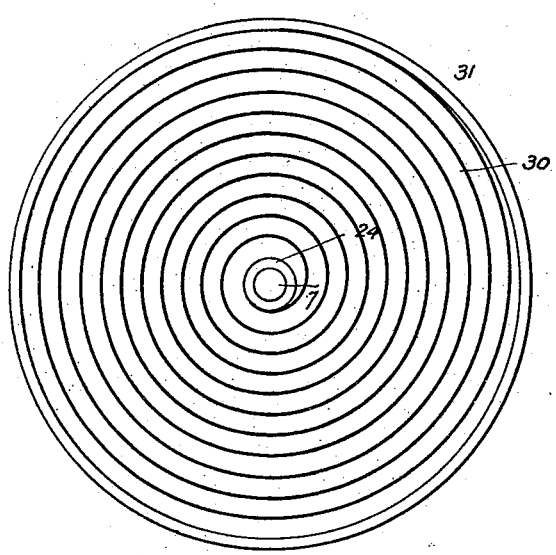
Figure 5:
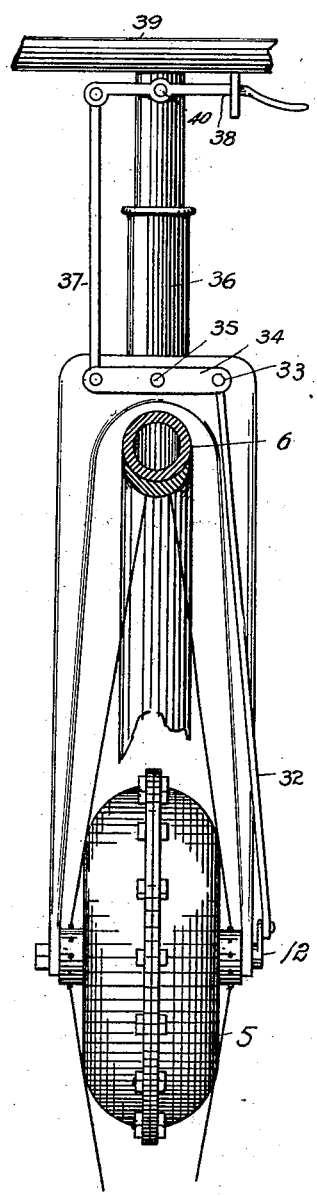
Figure 3:
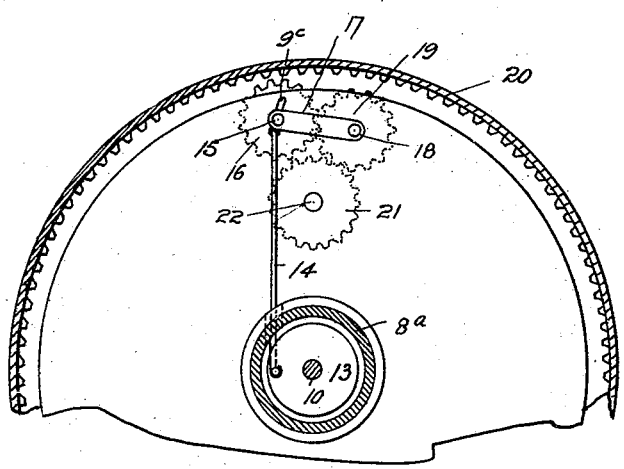

In the drawings, Figure 1 is a section taken through my improved motor mechanism on the line $xx$, Fig. 2. Fig. 2 is a section taken on the line $yy$, Fig. 1. Fig. 3 is a fragmentary view taken on the line $zz$, Fig. 1. Fig. 4 illustrates the spring and its casing. Fig. 5 illustrates the motor applied to the front wheel of a bicycle.

Similar reference characters indicating corresponding parts in these views, let the numeral 5 designate the casing inclosing the motor mechanism. This casing forms the hub of the bicycle-wheel 6 and is mounted by means of ball-bearings on an axle composed of two parts 7 and 8, attached to a plate 9, around which the casing 5 turns. The axle part 7 is screwed into a threaded aperture formed in the plate 9. The axle part 8 is hollow and provided with an enlarged portion $8^a$, screwed into a circular flange $9^a$, formed on the plate 9. Within the axle part 8, which is hollow, is journaled a short spindle 10, whose outer protruding extremity is provided with a crank 12 and whose inner extremity is provided with a wheel 13, having a wrist-pin which is attached to a rod 14, whose upper extremity engages the journal 15 of a gear 16, mounted on an arm 17, pivoted on the journal 18 of a gear 19. The journal 15 passes through a curved slot $9^c$, formed in the plate 9. The gear 16 meshes with the gear 19 and is adapted while still retaining its meshing position with the gear 19 to be shifted to mesh with an interior gear 20, formed on the casing 5. The gear 19 meshes with a gear 21, fast on a spindle 22, journaled in the plate 9. The gear 21 meshes also with a gear 23, fast on a sleeve 24, loosely mounted on the axle part 7. Upon the spindle 22 is loosely mounted a gear 25, carrying a spring-held dog 26, adapted to engage a ratchet-wheel 27, fast on the spindle 22, adjacent the gear. The loose gear 25 meshes with a pinion 28, surrounding the sleeve 24 and fast on a hub-casing plate 29.

The power-spring 30 is inclosed within a casing 31, fast on the stationary axle part 7. The inner extremity of the spring is attached to the sleeve 24, while its outer extremity is made fast to the outer wall of the casing 31.

For the purpose of shifting the gear 16 according as it is necessary to wind the spring 30 or utilize the power of the spring for propelling the machine, as may be desired, certain external features are employed, whereby the rider may effect the said adjustment without dismounting and while the wheel is still in motion. These features will now be described.

To a wrist on the crank 12 is attached the lower extremity of a rod 32, whose upper extremity is pivotally attached, as shown at 33, to one arm of a lever 34, fulcrumed on the steering-head 36, as shown at 35. To the opposite extremity of the lever 34 is pivoted the lower extremity of a rod 37, whose upper extremity is pivoted to a hand-lever 38, fulcrumed on the handle-bar 39, as shown at 40. Assuming that the gear 16 is out of mesh with the internal gear 20 of the casing, if it is desired to wind the spring 30 the gear 16 is thrown into mesh with the gear 20 through the instrumentality of the hand-lever 38, the rod 37, the lever 34, the rod 32, the crank 12, the spindle 10, the wheel 13, and the rod 14.

The gear 16 being in mesh with the gear 20 and the machine being in motion, the winding of the spring is effected by the following operation of the mechanism heretofore described: Assuming that the wheel and its gears are moving in the direction indicated by the arrow in Fig. 2, the gear 16 will be turned in the direction indicated by arrow 1, turning its meshing gear 19 in the direction indicated by arrow 2, the gear 21 in the direction indicated by arrow 3, and the gear 23 and its sleeve 24 in the direction indicated by arrow 4, thus winding the spring 30. The winding of the spring may be accomplished while going downhill or with a strong wind in the rider's back, it being my intention to utilize such occasion for storing energy in the spring to be used when required, as when going uphill or against a wind, as may be desired. Assuming that the spring is wound and that the rider desires to utilize its stored energy to propel or aid in propelling the machine, he disengages the gear 16 from the gear 20 through the instrumentality of the same elements employed to throw the gear into mesh and heretofore explained. As soon as the gear 16 is out of mesh with the gear 20 the recoil of the spring will reverse the movement of the sleeve 24 and the gear 23, which will then rotate in the direction opposite that indicated by arrow 4, turning its meshing gear 21 and the ratchet 27 in the direction opposite that indicated by arrow 3. In this event the ratchet catches the dog 26 and turns the loose gear 25 in a corresponding direction. The movement of the loose gear turns the hub-gear 28 and the casing 5 in the direction indicated by the arrow $a$, which corresponds with the direction indicated by the outer arrow or the direction in which the wheel is assumed to have been traveling during the winding of the spring.

Having thus described my invention, what I claim is—

1. In a motor, the combination with a casing mounted on the axle and forming the hub of the wheel, said casing being provided with a pinion surrounding the axle and adjacent thereto, and an internal gear remote from the axle, a loose gear 25 meshing with the pinion on the casing and carrying a spring-held dog, a gear 21 fast on the spindle of the loose gear, a ratchet-wheel also fast on the same spindle and adapted to engage the dog, a gear 19 meshing with the gear 21, a gear meshing with the gear 19 and journaled in an arm pivoted on the spindle of the gear 19 and adapted to be shifted to engage the internal gear of the casing or not, according as it is desired to wind the spring or utilize its stored power for turning the wheel, a gear 23 loosely mounted on the axle, and a power-spring attached to the sleeve of the gear 23 at one extremity and having its opposite extremity attached to a suitable stationary support.

2. In a motor, the combination with a casing mounted on the axle of the wheel and forming its hub, said casing being provided with a pinion surrounding the axle and in proximity thereto, and an internal gear remote from the axle, a loose gear 25 meshing with the pinion on the casing and carrying the dog, a gear 21 fast on the spindle of the loose gear, a ratchet-wheel also fast on the same spindle and adapted to engage the dog and carry the loose gear around with it when the ratchet is moving in one direction, a gear 19 meshing with the gear 21, a gear 16 meshing with the gear 19 and journaled in an arm pivoted on the spindle of the gear 19 and adapted to be shifted to engage the internal gear of the casing, a gear 23 loosely mounted on the axle, a power-spring having its inner extremity attached to the sleeve of the gear 23, and its outer extremity attached to a suitable stationary support, and means for shifting the gear 16 for the purpose set forth.

3. In a motor, the combination with a casing mounted on the axle of the wheel and forming its hub, said casing being provided with a pinion surrounding the axle and in proximity thereto, and an internal gear remote from the axle, a loose gear 25 meshing with the pinion on the casing and carrying the dog, a gear 21 fast on the spindle of the loose gear, a ratchet-wheel also fast on the same spindle and adapted to engage the dog and carry the loose gear around with it when the ratchet is moving in one direction, a gear 19 meshing with the gear 21, a gear 16 meshing with the gear 19 and journaled in an arm pivoted on the spindle of the gear 19 and adapted to be shifted to engage the internal gear of the casing, a gear 23 loosely mounted on the axle, a power-spring having its inner extremity attached to the sleeve of the gear 23, and its outer extremity attached to a suitable stationary support, and means for shifting the gear 16 for the purpose set forth, comprising a rod engaging the spindle on the gear 16, a spindle passing through the center of the axle of the wheel, a wheel fast on the inner extremity of the spindle, the said rod being connected with the wrist on the wheel, the outer protruding extremity of the spindle being provided with a crank, a rod connected with the said crank, a lever fulcrumed on the frame of the machine and having one arm connected with the said rod, another lever fulcrumed on the frame above the first-named lever, and a rod connecting the two levers.

In testimony whereof I affix my signature in presence of two witnesses.

CONSTANTINE HILL.

Witnesses:
A. J. O'BRIEN,
EDITH HIMSWORTH.